No. 857,610. PATENTED JUNE 25, 1907.
R. W. DULL.
CARRYING ROLL FOR BELT CONVEYERS, &c.
APPLICATION FILED MAR. 14, 1907.
2 SHEETS—SHEET 1.
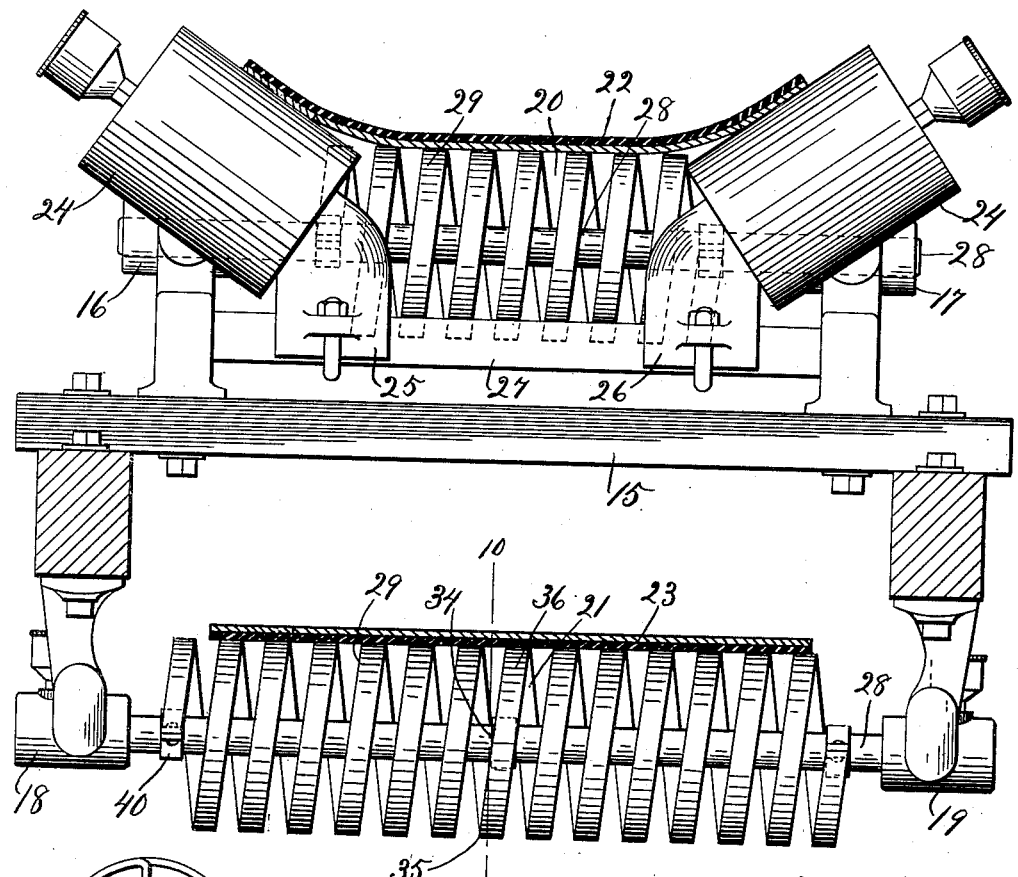
Fig.1.
Fig.3.
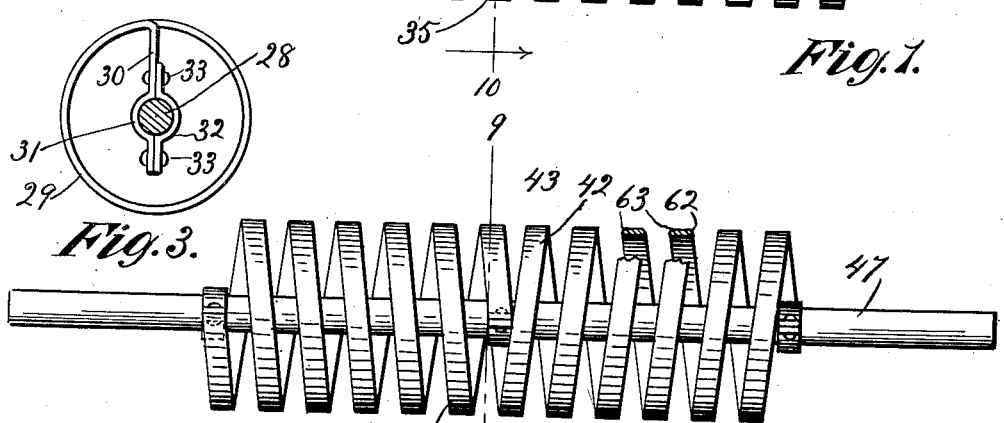
Fig.2.
Witnesses:
W. H. Cotton
Charles B. Gillson
Inventor:
Raymond W. Dull
By Louis K. Gibson Atty.

No. 857,610.
PATENTED JUNE 25, 1907.
R. W. DULL.
CARRYING ROLL FOR BELT CONVEYERS, &c.
APPLICATION FILED MAR. 14, 1907.
2 SHEETS—SHEET 2.
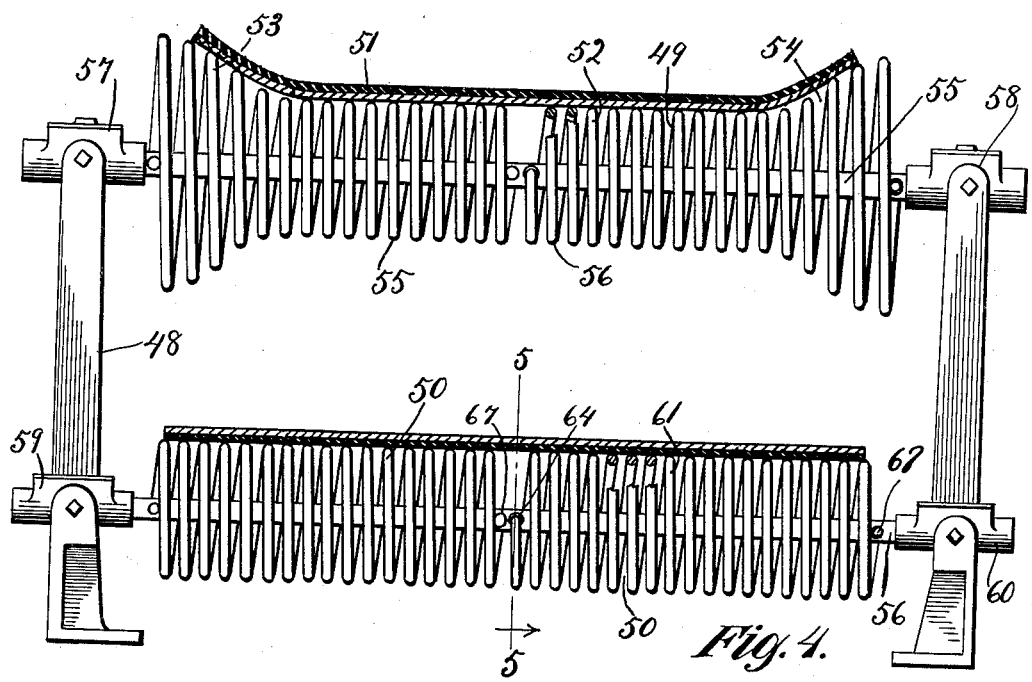
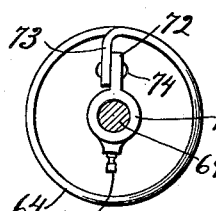
Fig. 6.
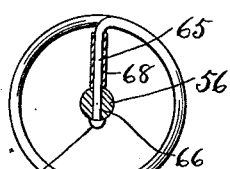
Fig. 5.
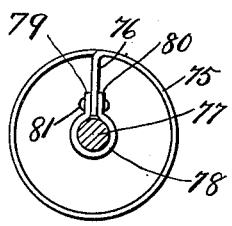
Fig. 7.
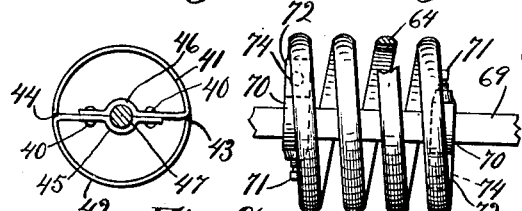
Fig. 9.   Fig. 8.
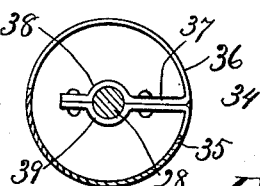
Fig. 10.
Witnesses:
W. H. Cotton
Charles B. Gillson.
Inventor:
Raymond W. Dull.
By
Louis K. Gillson Atty.

UNITED STATES PATENT OFFICE.

RAYMOND W. DULL, OF AURORA, ILLINOIS, ASSIGNOR TO STEPHENS-ADAMSON MNFG. CO., A CORPORATION OF ILLINOIS.

CARRYING-ROLL FOR BELT CONVEYERS, &c.

No. 857,610.

Specification of Letters Patent.

Patented June 25, 1907.

Application filed March 14, 1907. Serial No. 362,396.

*To all whom it may concern:*

Be it known that I, RAYMOND W. DULL, a citizen of the United States, and a resident of Aurora, county of Kane, and State of Illinois, have invented certain new and useful Improvements in Carrying-Rolls for Belt Conveyers and the Like, of which the following is a specification, and which are illustrated in the accompanying drawings, forming a part thereof.

The invention relates to rolls or pulleys adapted to be engaged by flat belts, and more particularly to such rolls as are employed for supporting the upper and lower laps of belt conveyers.

The object of the invention is to provide a roll of efficient and inexpensive construction; and the invention is exemplified by the devices to be hereinafter described, and illustrated in the accompanying drawings in which—

Figure 1 shows in front elevation a carrier for belt conveyers, having rolls constructed according to the invention for supporting the upper and lower laps of the belt shown in cross-section; Fig. 2 is a side elevation of a carrying roll for belt conveyers, showing a slightly modified form of embodiment of the invention; Fig. 3 is an end elevation of one of the carrying rolls shown in Fig. 1; Fig. 4 is similar to Fig. 1 but shows modified forms of carrying rolls; Fig. 5 is a detail section on the line 5—5 of Fig. 4; Figs. 6, 7 and 8 show other modifications of the invention; and Figs. 9 and 10 are sectional views taken on the lines 9—9 and 10—10 of Figs. 2 and 1, respectively.

The frame of a carrier for belt conveyers is shown in Fig. 1 of the drawings at 15, and as is usual in devices of this kind it is provided with journal bearings 16, 17 and 18, 19, for rollers 20 and 21 which support the upper and lower laps 22, 23, respectively, of the conveyer belt. Preferably an inclined concentrating roll 24 engages the upper lap 22 of the belt adjacent each of its margins to give the belt the form of a trough. These rolls turn upon brackets 25, 26, adjustably secured to a cross-member 27 of the carrier frame 15.

By means of the invention the rolls 20 and 21 are made of simple and inexpensive construction. As shown each comprises an arbor or mandrel 28, which turns in the journal bearings, as 16, 17, and 18, 19, and a bar 29 carried by the arbor and bent to form the periphery of the roll. Preferably the bar 29 is of oblong rectangular section and is bent to the form of a helix spaced apart from the arbor, one of the flat sides of the bar being directed outwardly.

Most conveniently the helical periphery of the roll is secured to the arbor 28 by turning in each of the ends 30, of the bar 29 from which it is formed, and as shown each of the inturned ends 30 is chamfered at 31 to receive the arbor, and a similarly chamfered clamping plate 32 is applied to the opposite side of the arbor and is secured to the bar 29 by rivets 33.

The periphery of the carrying roll may be supported from the arbor intermediate its ends, as indicated at 34, Fig. 1, to give additional strength to the roll. As shown this intermediate support is provided by forming the bar 29 which constitutes the periphery of the roll in a plurality of lengths, as 35, 36, the adjacent lengths having an overlapping end to end connection 37, most clearly shown in Fig. 10. The connected portions of the lengths 35, 36, are then inturned and oppositely chamfered, as indicated at 38, 39, to receive the arbor 28.

When the bar forming the periphery of the roll is made from a plurality of connected lengths, as just described, the adjacent lengths may be oppositely turned, as shown at 41, 42, Fig. 2. A central support for the periphery of the roll then preferably takes the form most clearly shown in Fig. 9, each of the lengths of the bar forming the periphery of the roll being inturned adjacent the overlapping connected portions 40, as indicated at 43, 44, and the overlapping connected portions being oppositely chamfered, as shown at 45, 46, to receive the arbor 47 of the roll. The periphery of a roll constructed in accordance with the invention need not be of uniform diameter throughout.

In Fig. 4 there is shown a carrier 48, having rolls 49, 50, for supporting the upper and lower turns, respectively, of a belt conveyer 51, the diameter of the helix into which the bar 52, forming the periphery of the roll 49, is bent being increased adjacent the ends of the roll, as indicated at 53, 54, to impart to the upper lap of the belt 51 the form of a trough. Each of the rolls 49 and 50 comprises an arbor, as 55, 56, respectively, the arbor 55 of the roll 49 being journaled in the frame of the carrier 48 at 57 and 58, and the arbor 56 of the roll 50 being journaled at 59 and 60. The bar 61 forming the periphery of the roll 50 is shown as being bent into the form of a helix of uniform diameter throughout.

Preferably the outwardly-directed side of the bar forming the periphery of the roll is rounded, as shown at 62, 63, Fig. 2, to reduce the wear upon the belt in turning over the roll. If desired the periphery of the roll may be formed from a bar of round section, as shown at 52 and 61, Fig. 4, or of half round section, as shown at 64, Figs. 6 and 8, the rounded side of the bar 64 being outwardly directed.

The ends of each of the bars 52 and 61, forming the periphery of the rolls 49 and 50, respectively, are inturned, as shown at 65, Fig. 5, and extend through an aperture 66 in the arbor of the roll. Withdrawal of the end of the bar from the aperture 66 is prevented by expanding or heading over the bar, as shown at 67, and to provide a shoulder against which this head of the bar may react to secure it in position a sleeve 68 incloses the inturned part of the bar between the arbor and the periphery of the roll.

The bar 64 of half round section, forming the periphery of the roll shown in Figs. 6 and 8, and the arbor 69 of the roll, are most conveniently united by a bushing 70 fixed in position on the arbor by a set-screw 71, and having a shoulder 72 to which the inturned end 73 of the bar 64 is secured by rivets 74. When the periphery of the roll is made from a flat bar, as 75, the inturned end 76 of the bar may be secured to the arbor 77 of the roll in the manner shown in Fig. 7. An open ring 78, having its ends flanged outwardly, as indicated at 79, 80, is applied to the arbor 77 and receives the inturned end 76 of the bar 75 between its flanges, which are united thereto by a rivet 81.

I claim as my invention—

1. A carrying roll for belt conveyers comprising, in combination, an arbor, and a bar bent to helical form spaced apart from the arbor and forming the periphery of the roll, the ends of the bar being inturned and secured to the arbor.

2. A carrying roll for belt conveyers comprising, in combination, an arbor, a bar bent to helical form spaced apart from the arbor and forming the periphery of the roll, and connection between the ends of the bar and the arbor.

3. A carrying roll for belt conveyers comprising, in combination, a rigid arbor extending from end to end of the roll, and a bar bent to helical form about the arbor and forming the periphery of the roll, the ends of the bar being secured to the arbor.

4. A carrying roll for belt conveyers comprising, in combination, an arbor, a bar bent to helical form spaced apart from the arbor and forming the periphery of the roll, one end of the bar being inturned and chamfered to receive the arbor, and clamping means for securing the chamfered end of the bar to the arbor.

5. A carrying roll for belt conveyers comprising, in combination, an arbor, and a plurality of bars having overlapping end to end connection, such bars being bent to helical form and spaced apart from the arbor to form the periphery of the roll, and the connected ends of the bars being inturned and oppositely chamfered to receive the arbor.

RAYMOND W. DULL.

Witnesses:
CHARLES B. GILLSON,
E. M. KLATCHER.